(12) United States Patent
Hu et al.

(10) Patent No.: US 10,126,433 B2
(45) Date of Patent: Nov. 13, 2018

(54) ENERGY DETECTION APPARATUS, METHODS, AND SYSTEMS

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 185 days.

(21) Appl. No.: 15/026,167

(22) PCT Filed: Nov. 10, 2014

(86) PCT No.: PCT/US2014/064793
§ 371 (c)(1),
(2) Date: Mar. 30, 2016

(87) PCT Pub. No.: WO2016/076824
PCT Pub. Date: May 19, 2016

(65) Prior Publication Data
US 2016/0320497 A1 Nov. 3, 2016

(51) Int. Cl.
*E21B 47/00* (2012.01)
*G21K 1/02* (2006.01)
(Continued)

(52) U.S. Cl.
CPC ............. *G01T 1/2018* (2013.01); *G01V 5/12* (2013.01)

(58) Field of Classification Search
CPC ................ A61B 6/4085; A61B 6/06; A61N 2005/1087; G01N 23/046; G01N 2201/0633
See application file for complete search history.

(56) References Cited

U.S. PATENT DOCUMENTS 3,543,384 A 12/1970 Hansen
4,054,800 A 10/1977 Leask
(Continued)

FOREIGN PATENT DOCUMENTS

JP 08160145 A 6/1996
JP 2005249411 A 9/2005
(Continued)

OTHER PUBLICATIONS

"International Application Serial No. PCT/US2014/064793, International Search Report dated Aug. 7, 2015", 3 pgs.
(Continued)

*Primary Examiner* — Don Wong
(74) *Attorney, Agent, or Firm* — Haynes and Boone, LLP (57) ABSTRACT

In some embodiments, an apparatus and a system, as well as a method and an article, may operate to receive energy impinging on an outer surface of a photon detector having a columnar structure, and to direct the energy within the columnar structure to a position-sensitive readout to image the energy, wherein the position-sensitive readout has position-sensitive elements, and wherein individual ones of the elements are associated with at least one column in the columnar structure to provide intrinsic collimation of the energy from the outer surface to selected portions of the readout. Additional apparatus, systems, and methods are described.

18 Claims, 6 Drawing Sheets

(51) Int. Cl.
*G01T 1/20* (2006.01)
*G01V 5/12* (2006.01)

(56) References Cited

U.S. PATENT DOCUMENTS

| | | | |
|---|---|---|---|
| 4,638,158 | A | 1/1987 | Sonne et al. |
| 4,985,742 | A | 1/1991 | Pankov |
| 5,536,953 | A | 7/1996 | Dreifus et al. |
| 5,773,829 | A | 6/1998 | Iwanczyk et al. |
| 6,262,422 | B1 | 7/2001 | Homme et al. |
| 6,768,326 | B2 | 7/2004 | Brown et al. |
| 6,770,885 | B2 | 8/2004 | Eberhard et al. |
| 6,838,741 | B2 | 1/2005 | Sandvik et al. |
| 6,891,164 | B2 | 5/2005 | Suzuki |
| 6,921,909 | B2 | 7/2005 | Nagarkar et al. |
| 6,980,629 | B1 | 12/2005 | Hoheisel et al. |
| 7,291,843 | B2 | 11/2007 | Monin et al. |
| 7,402,814 | B2 | 7/2008 | Vieux et al. |
| 7,418,082 | B2 | 8/2008 | Levene et al. |
| 7,442,932 | B2 | 10/2008 | Schultz et al. |
| 7,633,058 | B2 | 12/2009 | Stoller et al. |
| 7,638,761 | B2 | 12/2009 | Csutak |
| 7,730,748 | B2 | 6/2010 | Haochuan |
| 7,763,845 | B2 | 7/2010 | Estes et al. |
| 7,786,447 | B2 | 8/2010 | Kondo et al. |
| 7,829,858 | B2 | 11/2010 | Mochizuki et al. |
| 8,039,792 | B2 | 10/2011 | Nikitin et al. |
| 8,044,480 | B2 | 10/2011 | Dast |
| 8,164,065 | B2 | 4/2012 | Mochizuki et al. |
| 8,257,996 | B2 | 9/2012 | Vieux et al. |
| 8,405,020 | B2 | 3/2013 | Menge |
| 8,461,536 | B2 | 6/2013 | Goto |
| 8,541,750 | B2 | 9/2013 | Chen et al. |
| 8,604,441 | B2 | 12/2013 | Mao et al. |
| 8,692,182 | B2 | 4/2014 | Nikitin |
| 8,723,127 | B2 | 5/2014 | Goto et al. |
| 8,803,075 | B2 | 8/2014 | Menge et al. |
| 2002/0017613 | A1 | 2/2002 | Homme et al. |
| 2002/0020846 | A1 | 2/2002 | Pi et al. |
| 2004/0042585 | A1 | 3/2004 | Nagarkar et al. |
| 2005/0017182 | A1 | 1/2005 | Joung |
| 2010/0200758 | A1 | 8/2010 | Fukuda et al. |
| 2011/0121185 | A1 | 5/2011 | Hirai et al. |
| 2011/0260066 | A1 | 10/2011 | Vieux |
| 2013/0126746 | A1 | 5/2013 | Bolotnikov et al. |
| 2013/0168567 | A1 | 7/2013 | Wartski et al. |
| 2013/0292685 | A1 | 11/2013 | Jiang et al. |
| 2013/0292687 | A1 | 11/2013 | Jiang et al. |
| 2014/0037065 | A1 | 2/2014 | Botto |
| 2014/0056405 | A1 | 2/2014 | Kurokawa et al. |
| 2014/0093038 | A1 | 4/2014 | Thalhammer et al. |
| 2014/0217297 | A1 | 8/2014 | Bolotnikov et al. |
| 2014/0319330 | A1 | 10/2014 | Berheide et al. |
| 2016/0291198 | A1* | 10/2016 | Lee .......... G01V 5/125 |

FOREIGN PATENT DOCUMENTS

| | | |
|---|---|---|
| WO | WO-2013/012809 A1 | 1/2013 |
| WO | WO-2013/045872 A1 | 4/2013 |
| WO | WO-2016/076824 A1 | 5/2016 |
| WO | WO-2016/076919 A1 | 5/2016 |
| WO | WO-2016/076920 A2 | 5/2016 |

OTHER PUBLICATIONS

"International Application Serial No. PCT/US2014/064793, Written Opinion dated Aug. 7, 2015", 10 pgs.

"International Application Serial No. PCT/US2015/033579, International Search Report dated Aug. 21, 2015", 3 pgs.

"International Application Serial No. PCT/US2015/033579, Written Opinion dated Aug. 21, 2015", 9 pgs.

"International Application Serial No. PCT/US2015/033589, International Search Report dated Aug. 26, 2015", 3 pgs.

"International Application Serial No. PCT/US2015/033589, Written Opinion dated Aug. 26, 2015", 8 pgs.

Kim, H., et al., "Continued development of thallium bromide and related compounds for gamma-ray spectrometers", *Nuclear Instruments and Methods in Physics Research Section A*, 629(1), (2011), 192-196.

Nagarkar, V. V., et al., "High Resolution X-Ray Sensor for Non Destructive Evaluation", *IEEE Transactions on Nuclear Science*, 43(3), (Jun. 1996), 1559-1563.

Nagarkar, V. V., et al., "Structured CsI(Tl) Scintillators for X-ray Imaging Applications", *IEEE Transactions on Nuclear Science*, 45(3), (Jun. 1998), 492-496.

Packham, Daniel, "Testing and Characterisation of Scintillator Materials for X-ray Detection", Thesis,University of Surrey, (2010), 136 pgs.

Ponpon, J. P., "Semiconductor detectors for 2DX-ray imaging", *Nuclear Instruments and Methods in Physics Research Section A*, 551(1),(2005), 15-26.

Safavi-Naeini, M., et al., "Evaluation of pixellated, back-sided planar photodetectors for high-resolution imaging instrumentation", *Nuclear Instruments and Methods in Physics Research Section A*, 589(2), (2008), 259-267.

Zuck, A., et al., "Microstructure and Energy Resolution of 59.6 keV [241] Am Gamma Absorption inPolycrystalline $HgI_2$ Detectors", *IEEE Transactions on Nuclear Science*, 51(3), (Jun. 2004), 1250-1255.

* cited by examiner

ENERGY DETECTION APPARATUS, METHODS, AND SYSTEMS

PRIORITY APPLICATIONS

This application is a U.S. National Stage Filing under 35 U.S.C. 371 from International Application No. PCT/US2014/064793, filed on 10 Nov. 2014, which application is incorporated herein by reference in its entirety.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole.

For example, portions of the formation or cement surrounding a borehole may be imaged using various forms of energy, such as ultrasound, radio-frequency, or X-rays. Various devices may be used to obtain such images, with varying degrees of success.

DETAILED DESCRIPTION

In conventional imaging devices that use a scintillation crystal for position-sensitive measurements, an external collimator is used to achieve position sensitivity with respect to energy that impinges on the crystal. However, crosstalk within the crystal (after collimation occurs) blurs the resulting image, due to the undirected nature of the energy path within the crystal. To address some of these challenges, as well as others, apparatus, systems, and methods are described herein that provide improved resolution for downhole imaging.

In some embodiments, a position sensitive detection apparatus with intrinsic collimation provides enhanced spatial resolution by reducing the amount of crosstalk within the crystal. Thus, X-rays can be converted into light by the scintillator, or into electron hole pairs by a semiconductor. A position-sensitive readout element can be used to detect the corresponding signal from the crystal or semiconductor, to create images with improved spatial resolution (as compared to the prior collimation-crystal approach).

Thus, some embodiments of the invention comprise two parts, perhaps formed as an integral whole: a crystal with a columnar structure, and a position-sensitive readout (PSR). That is, in addition to using a photon detector (e.g., crystal) that has a columnar structure to direct impinging energy, many embodiments include a position-sensitive readout with high spatial resolution, to take advantage of the intrinsic columnar structure of the photon detector.

To provide a more consistent use of terminology throughout this document, specific terms and phrases are used. They are defined as follows:

housing means any one or more of a drill collar, a downhole tool, or a wireline logging tool body (all having an outer surface, to enclose or attach to detectors, PSRs, magnetometers, sensors, fluid sampling devices, pressure measurement devices, temperature measurement devices, transmitters, receivers, acquisition and processing logic, and data acquisition systems).

image, when used as a noun, means a collection of pixel data that can be processed to form a human-readable representation of a thing, such as a formation; when used as a verb, this terms refers to the activity of sensing, over a set of elements, the relative amount of energy directed to those elements according to their location with respect to the surrounding environment.

intrinsic collimation means that energy impinging on one of the columns in the columnar structure of the detector is transformed into light or electron-hole pairs that are confined and directed by that column to a corresponding, predetermined, and fixed portion of the surface of the position-sensitive readout structure.

Various embodiments of the invention may use an intrinsically collimated scintillator/semiconductor, in conjunction with a position-sensitive readout as an X-ray detection apparatus for downhole applications. For example, such an apparatus can be used to provide downhole X-ray tomography images for cement integrity evaluation and formation density evaluation. Various embodiments that include some or all of these features will now be described in detail.

Figure 1:
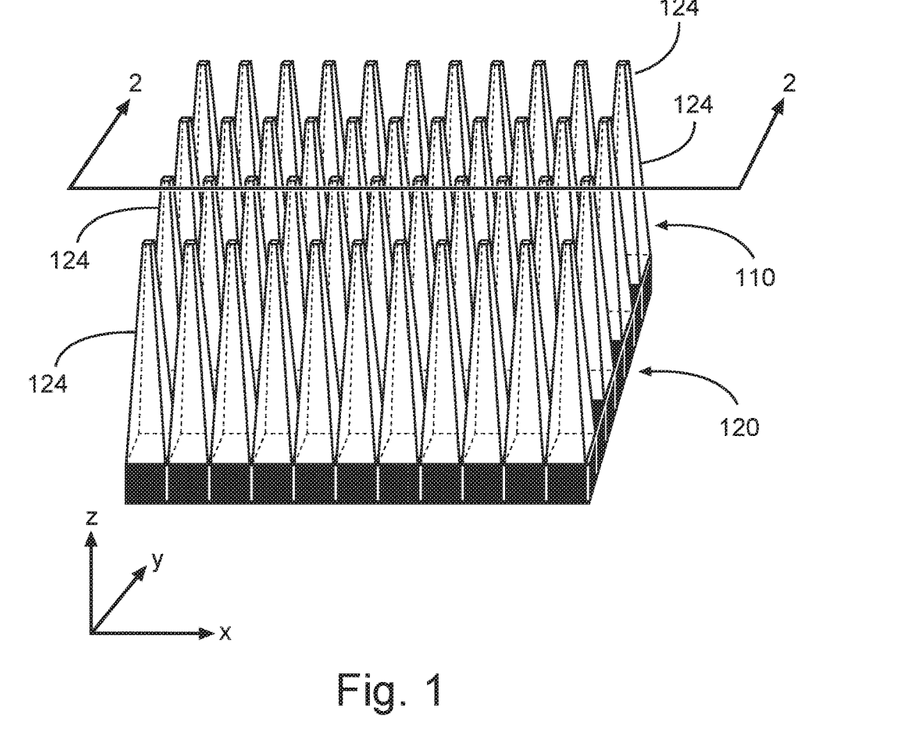
FIG. 1 is a perspective view of an energy detection apparatus according to various embodiments of the invention.

FIG. 1 is a perspective view of an energy detection apparatus 100 according to various embodiments of the invention. Here a photon detector 110 with a columnar structure can be seen. The photon detector 110 may be formed as a crystal. The energy detection apparatus 100 may further comprise a PSR 120. The photon detector 110 has a columnar structure comprising a set of individual columns 124.

Figure 2:
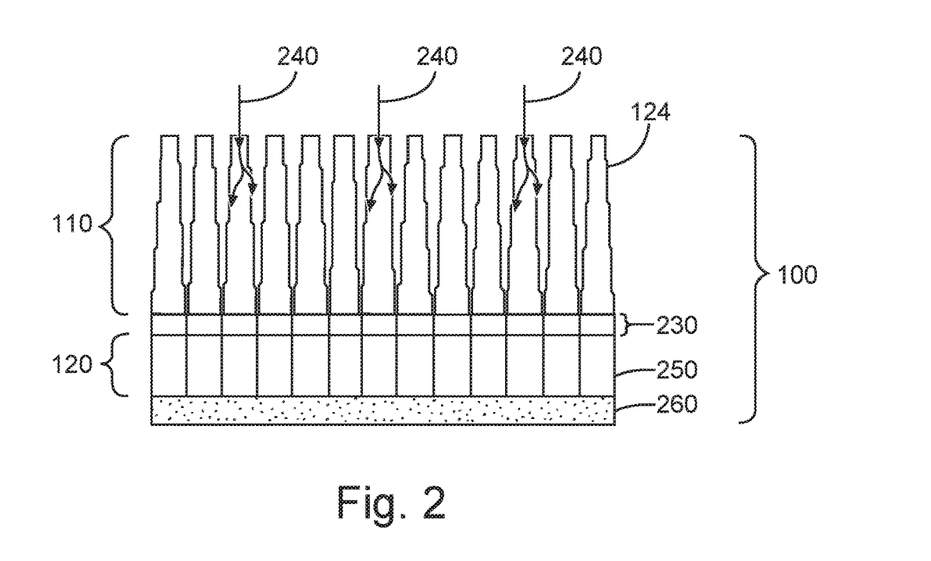
FIG. 2 is a sectioned side, cut-away view of the energy detection apparatus shown in FIG. 1.

FIG. 2 is a sectioned side-view of the energy detection apparatus 100 shown in FIG. 1. Here the intrinsic collimation features of the various embodiments become more apparent.

Depending on the type of photon detector 110 that is used, the resulting apparatus 100 can be characterized as an indirect detection apparatus 100, or a direct detection apparatus 100. For example, the choice of crystal forming a photon detector 110 can include a scintillator, such as cesium iodide, activated by thallium (CsI (Tl)), or a semiconductor, such as mercury iodide ($HgI_2$).

The PSR 120 for a scintillator may comprise a charge-coupled device (CCD), a pixelated complementary metal-oxide semiconductor (CMOS) imager, or a position-sensitive photon-multiplier tube (PSPMT). The PSR 120 for a semiconductor may comprise one or more application specific integrated circuits (ASICs).

For an indirect detection apparatus 100, the detector 110 may take the form of a crystal scintillator with a columnar structure, such as a sputter-deposited CsI (Tl). A photon detector 110 having columns that are taller in the vertical direction Z than they are wide in the horizontal direction X-Y (as shown in FIGS. 1 and 2) operates to confine the energy 240 to the individual columns 124 that capture portions of the energy 240 due to impingement. This feature of intrinsic collimation helps to reduce the crosstalk between neighboring position-sensitive elements 250 of the PSR 120 (e.g., pixels), enhancing the spatial resolution of the resulting image formed by the collection of the position-sensitive elements 250.

For a direct detection apparatus 100, the detector 110 may be chosen as a semiconductor crystal with a columnar structure, such as physical vapor-deposited $HgI_2$. The columnar structure guides the passage of electrons and holes. Unlike a collimator, which only functions in the presence of light, the columnar structure of a semiconductor can also confine electron/hole drift within its respective columns. This ability serves to reduce the overlap of the electron charge cloud between individual position-sensitive elements 250. Again, spatial resolution of the resulting image is enhanced.

The PSR 120 may comprise a unitary, integral structure with individual position-sensitive elements 250. In some embodiments, the PSR 250 comprises a structure with individual position-sensitive elements 250 that were originally separated, but have become bound together by attaching them to each other, or to a substrate 260. Thus, the structure of the PSR 120 may comprise a pixelated structure of position-sensitive elements 250 that can operate to detect signals transferred from one or more columns 124 of the detector 110.

For the indirect detection apparatus 100, the PSR 120 may be chosen as a CCD. CMOS sensor, or multi-anode Photo Multiplier Tube (PMT). CCD elements, photodiodes in a CMOS sensor, or photocathodes in a PMT can each be used to detect light that is provided by a scintillator (used as the detector 110).

In a direct detection form of the apparatus 100, the PSR 120 comprise one or more ASICs that are used to detect the electrical signal generated by the detector 110, such as a semiconductor crystal, as a result of X-ray conversion. Depending on the targeted function of the detector 110, the PSR 120 can be designed to implement various modes of operation, such as charge integrating, photon counting, or spectrometric. The PSR 120 can thus be used to generate a variety of image information, including intensity, photon counts, energy resolution, and spatial resolution.

The photon detector 110 and the position-sensitive readout 120 may be mechanically coupled to each other, by direct abutment (e.g., being disposed in direct physical contact, as shown in FIG. 1), and/or via chemical bonding (as shown in FIG. 2). An example of chemical bonding may include an adhesive 230 disposed between the detector 110 and the PSR 120. If an adhesive 230 is used, it should operate to maintain the directed propagation of energy 240 between individual columns 124 in the detector 110, and the position-sensitive element(s) 250 associated with each of those columns 124.

Figure 3:
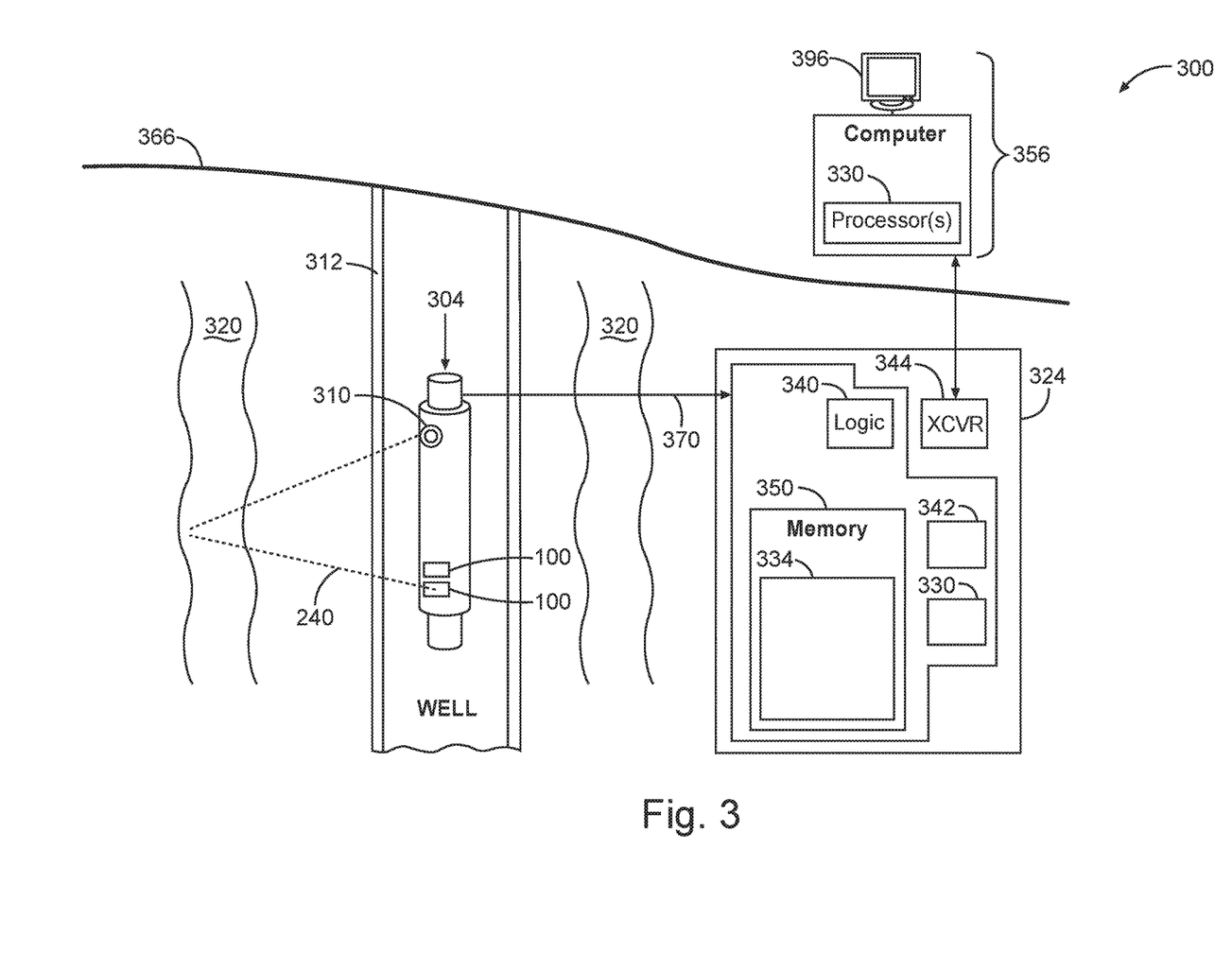
FIG. 3 is a block diagram of apparatus and systems according to various embodiments of the invention.

FIG. 3 is a block diagram of apparatus 100 and systems 300 according to various embodiments of the invention. In some embodiments, a system 300 includes a housing 304. The housing 304 might take the form of a wireline tool body, or a downhole tool. Processor(s) 330 within the system 300 may be located at the surface 366, as part of a surface logging facility 356, or in a data acquisition system 324, which may be above or below the Earth's surface 366 (e.g., attached to the housing 304).

A system 300 may further comprise a data transceiver 344 (e.g., a telemetry transmitter and/or receiver) to transmit acquired data 370 to a surface logging facility 356. The data 370 may comprise image information, such as the magnitude of individual energy signals captured by position-sensitive elements in the apparatus 100 resulting from an energy source 310 that transmits energy (e.g., X-rays) into a formation 320, which is reflected to form energy 240 that impinges on the apparatus 100. Logic 340 can be used to acquire the data as signals, according to the various methods described herein. The acquired data 370, as well as other data, can be stored in the memory 350, perhaps as part of a database 334. The processors 330 can be used to process the data 370 to form images of cement 312 surrounding a well, or the formation 320 itself.

Thus, referring to FIGS. 1-3, it can be seen that many embodiments may be realized. For example, an apparatus 100 may comprise a photon detector 110 having a columnar structure to direct impinging energy 240. The apparatus 100 may further comprise a PSR 120 having position-sensitive elements 250, wherein individual ones of the elements 250 are associated with at least one column 124 in the columnar structure to provide intrinsic collimation of the impinging energy 240 from an outer surface of the at least one column to selected portions of the PSR 120.

In some embodiments, the photon detector 120 may comprise a scintillator. In some embodiments, the scintillator may be created using a number of processes, including sputter-deposition. Thus, the scintillator used in a photon detector 120 may comprise sputter deposited CsI (T1).

In some embodiments, individual columns 124 in the columnar structure may have any number of shapes, including rectangular blocks, cones, including truncated cones, needles, trapezoidal prisms, and/or pyramids, including truncated pyramids (as shown in FIG. 1). Thus, the individual columns 124 may have a shape selected from one of a block, a cone, a needle, a pyramid, or a trapezoidal prism.

In some embodiments, the photon detector 110 may comprise semiconductor material. Thus, the photon detector 110 may comprise a semiconductor.

In some embodiments, a semiconductor formed into a photon detector 110 may be manufactured in a variety of way, including vapor deposition. Thus, the semiconductor used in a photon detector 110 may comprise vapor-deposited $HgI_2$.

In some embodiments, the PSR may be made up of a variety of devices, including CCDs, CMOS devices, and photomultiplier tubes—alone or in combination. Thus, the PSR 120 may comprise at least one of a CCD, a CMOS device, a position-sensitive solid state photomultiplier, or a multi-anode PMT.

In some embodiments, the PSR 120 may also take the form of an electrical circuit that detects and/or processes electrical signals generated by the photon detector 110. Thus, the PSR 120 may comprise an electrical circuit 338 to detect an electrical signal generated by the detector 110 (where the detector 110 may comprise a semiconductor), in response to receiving at least a portion of the energy 240 at the position-sensitive elements 250, as directed thereto by the columnar structure of the detector 110. Thus, in some embodiments, the electrical circuit 338 may comprise digital and/or analog logic 340, including a processor 330 and/or an ASIC 342.

In some embodiments, a system 300 may comprise a source 310 of energy 240, one or more energy detection apparatus 100, as previously described, and a housing 304. The housing 304 may be used to contain and protect the source 310 of energy 240 and/or one or more components of the energy detection apparatus 100. The housing 304 may comprise one of a wireline tool or a drilling tool.

The source 310 may comprise a number of devices, including an X-ray source. Thus, the source 310 of energy 240 may comprise one of a continuous X-ray source or a pulsed X-ray source.

In some embodiments, the system 300 may comprise one or more processors 330 to operate various components in the system 330, and to process data 370 acquired therefrom. Thus, a system 300 may comprise a processor 330 coupled to a memory 350 including a program, wherein the program is to direct the processor 330 to operate the energy source 310 and to receive signals (e.g., taking the form of data 370, or even electrical signals provided directly from the PSR 130 to the logic 340.

Figure 4:
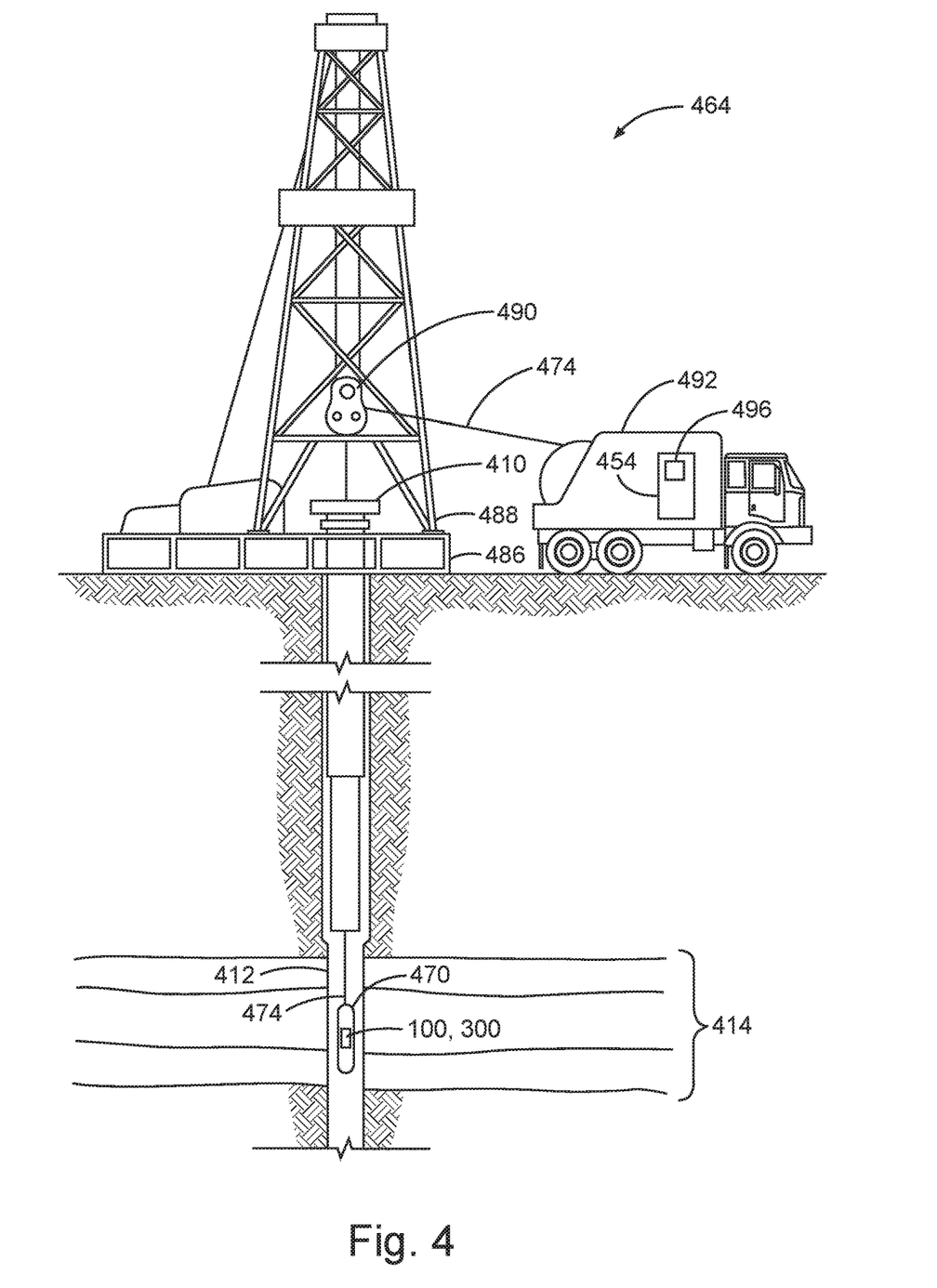
FIG. 4 illustrates a wireline system embodiment of the invention.
Figure 5:
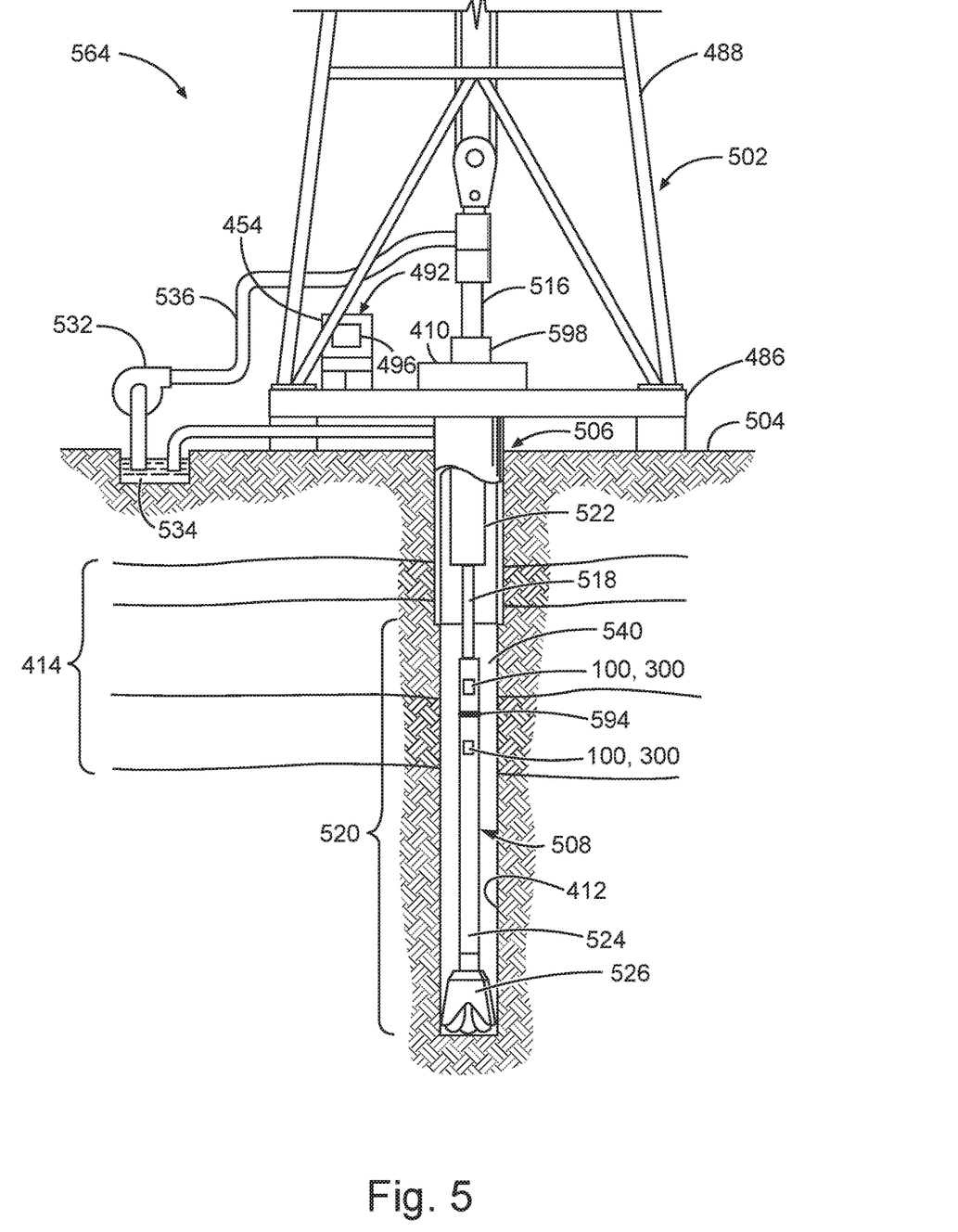
FIG. 5 illustrates a drilling rig system embodiment of the invention.

FIG. 4 illustrates a wireline system 464 embodiment of the invention, and FIG. 5 illustrates a drilling rig system 564 embodiment of the invention. Therefore, the systems 464, 564 may comprise portions of a wireline logging tool body 470 as part of a wireline logging operation, or of a downhole tool 524 as part of a downhole drilling operation. The systems 464 and 564 may include any one or more elements of the apparatus 100 and systems 300 shown in FIGS. 1-3.

Thus, FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths, various instruments included in the tool body 470 may be used to perform measurements (e.g., made by the apparatus 100 shown in FIGS. 1-3) on the subsurface geological formations 414 adjacent the borehole 412 (and the tool body 470). The borehole 412 may represent one or more offset wells, or a target well.

The measurement data can be communicated to a surface logging facility 492 for processing, analysis, and/or storage. The logging facility 492 may be provided with electronic equipment for various types of signal processing, which may be implemented by any one or more of the components of the system 300 in FIG. 3. Similar formation evaluation data may be gathered and analyzed during drilling operations (e.g., during logging while drilling operations, and by extension, sampling while drilling).

In some embodiments, the tool body 470 is suspended in the wellbore by a wireline cable 474 that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a downhole tool 524, and a drill bit 526. The drill bit 526 may operate to create the borehole 412 by penetrating the surface 504 and the subsurface formations 414. The downhole tool 524 may comprise any of a number of different types of tools including measurement while drilling tools, logging while drilling tools, and others.

During drilling operations, the drill string 508 (perhaps including the Kelly 516, the drill pipe 518, and the bottom hole assembly 520) may be rotated by the rotary table 310. Although not shown, in addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area between the drill pipe 518 and the sides of the borehole 312. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1-5, it may be seen that in some embodiments, the systems 464, 564 may include a drill collar 522, a downhole tool 524, and/or a wireline logging tool body 470 to house one or more apparatus 100, similar to or identical to the apparatus 100 described above and illustrated in FIGS. 1-2. Any and all components of the system 300 in FIG. 3 may also be housed by the tool 524 or the tool body 470.

The tool 524 may comprise a downhole tool, such as a logging while drilling (LWD) tool or a measurement while drilling (MWD) tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present X-ray image data in a well, perhaps in graphic form. Formation and/or cement density and structure may also be displayed.

The apparatus 100; detector 110; PSR 120; columns 124; adhesive 230; elements 250; substrate 260; systems 300, 464, 564; housing 304; source 310; data acquisition system 324; processors 330; database 334; circuit 338; logic 340; ASIC 342; transceiver 344; memory 350; surface logging facility 356; data 370; rotary table 410; borehole 412; computer workstations 454; wireline logging tool body 470; drilling platform 486; derrick 488; hoist 390; logging facility 492; display 496; drill string 508; Kelly 516; drill pipe 518; bottom hole assembly 520; drill collars 522; downhole tool 524; drill bit 526; mud pump 532; mud pit 534; and hose 536 may all be characterized as "modules" herein.

Such modules may include hardware circuitry, and/or a processor and/or memory circuits, software program modules and objects, and/or firmware, and combinations thereof, as desired by the architect of the apparatus 100 and systems 300, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 300, 364, 464 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
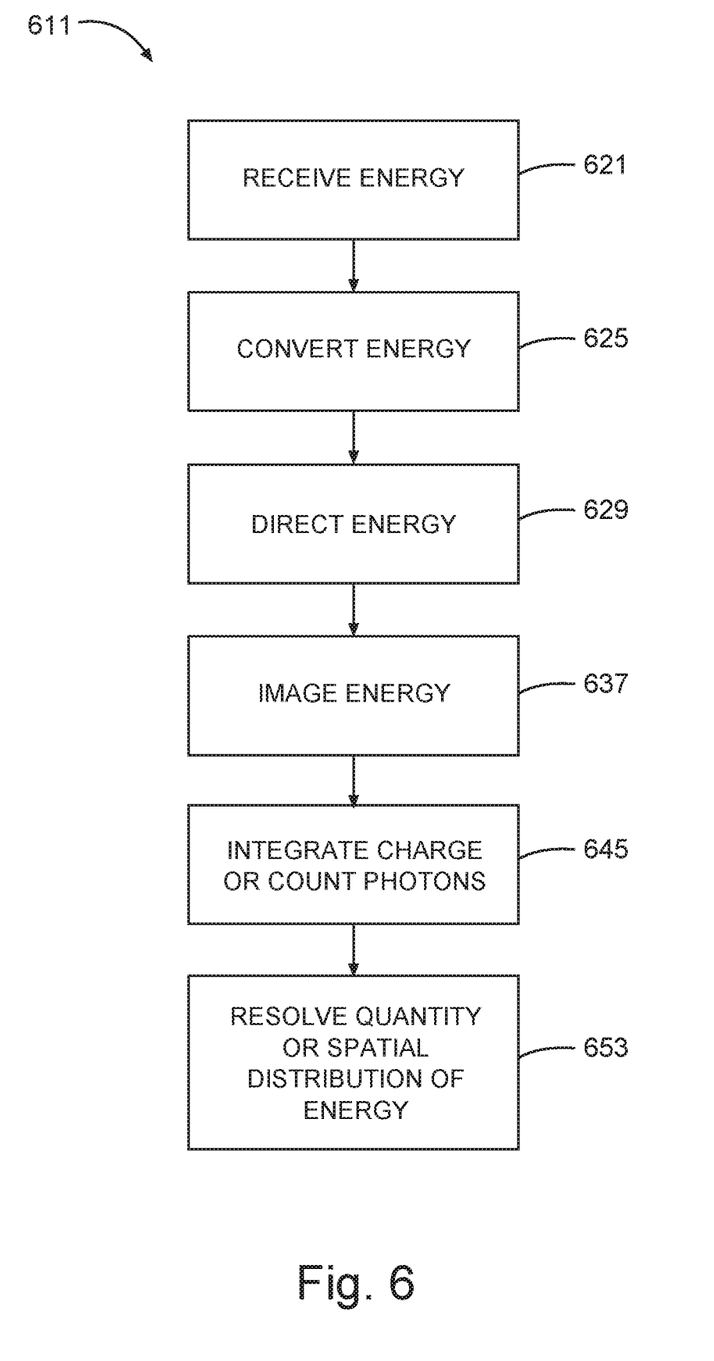
FIG. 6 is a flow chart illustrating several methods according to various embodiments of the invention.

For example, FIG. 6 is a flow chart illustrating several methods 611 according to various embodiments of the invention. The method 611 may comprise processor-implemented methods, to execute on one or more processors that perform the methods. For example, one embodiment of the methods 611 may begin at block 621 with receiving energy, and continue on to block 629 with directing the energy within the columnar structure of a photon detector to a position-sensitive readout, via intrinsic collimation. Other embodiments may be realized.

For example, in some embodiments, the method 611 begins at block 621 with receiving energy impinging on an outer surface of a photon detector having a columnar structure.

In some embodiments, the energy received by the photon detector may comprise a variety of energy types, and the energy may be converted by the detector into other forms. Thus, the energy may comprise X-ray energy, and the method 611 may comprise converting the X-ray energy to light or electron-hole pairs at block 625.

In some embodiments, the columnar structure of the photon detector serves to direct acquired energy to a PSR, acting as a waveguide or physical channel for the energy. Thus, the columnar structure may serves as a waveguide for the light, or a channel to confine drift of the electron-hole pairs.

In many embodiments, the method 611 continues on to block 629 with directing the energy within the columnar structure to the PSR, perhaps to image the energy. As noted previously, the PSR may comprise position-sensitive elements, wherein the individual elements are associated with at least one column in the columnar structure to provide intrinsic collimation of the energy from the outer surface of the photon detector (e.g., the outer surfaces of the columns that have received the energy), to selected portions of the readout.

Therefore, as a result of being directed from the photon detector to the PSR, an image of the energy distribution proximate to the photon detector may be formed. Thus, some embodiments of the method 611 may comprise imaging the energy by detecting one of light or an electrical signal at a surface of the readout at block 637.

Once the energy has been directed to the position-sensitive readout, various operations may be carried out, such as integrating the charge that is present, or counting photons. Thus, in some embodiments, the method 611 may comprise one of integrating charge or counting photons at a surface of the readout at block 645.

Downhole formation images may be formed using a variety of techniques, such a resolving the quantity or spatial distribution of energy at the surface of the position-sensitive readout. Thus, in some embodiments, the method 611 may comprise resolving a quantity or a spatial distribution of the energy at a surface of the PSR (as is well known to those of ordinary skill in the art) to provide downhole formation images.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
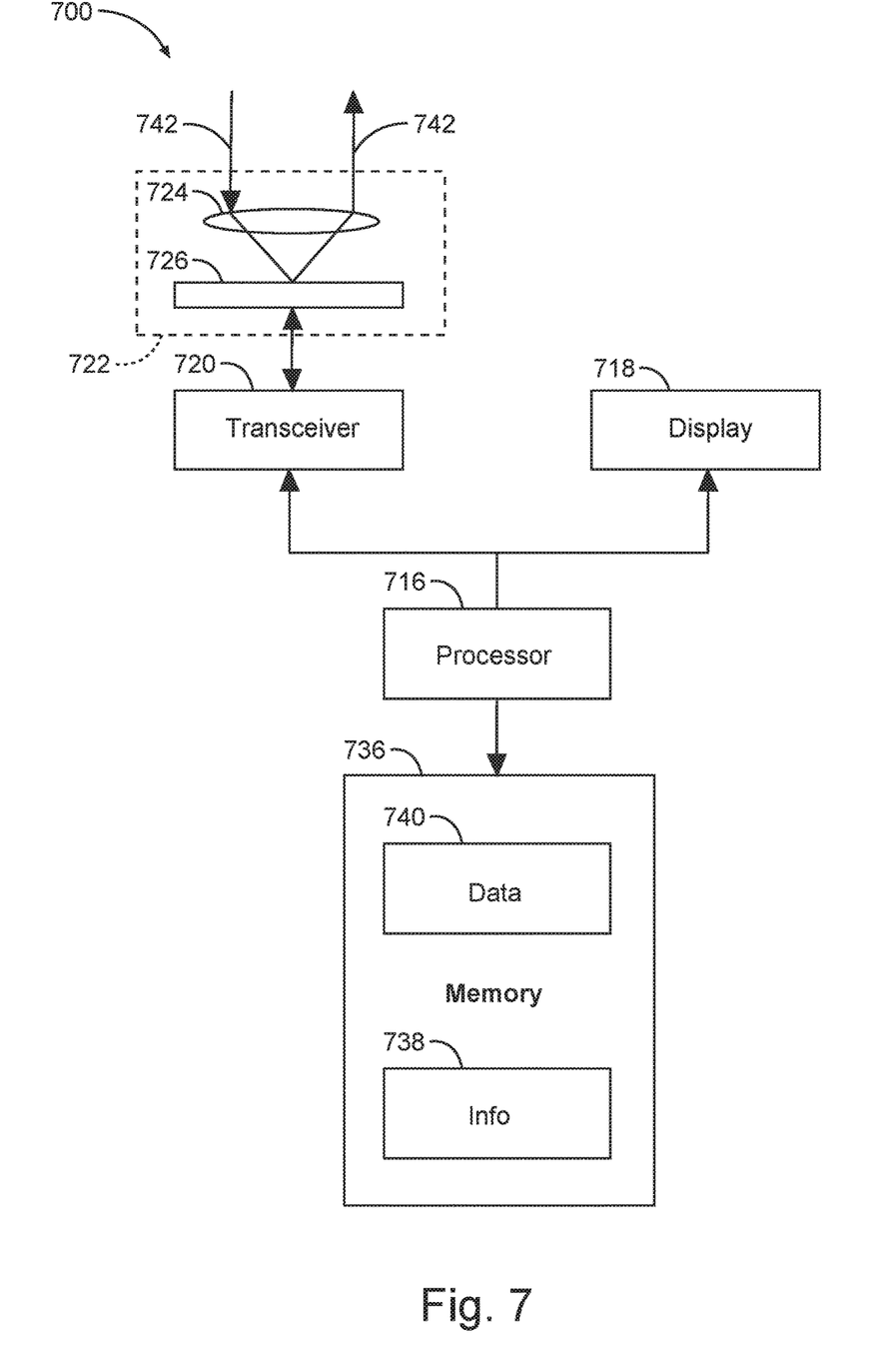
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor having associated information 738 (e.g., computer program instructions and/or data), which when executed by one or more of the processors 716, results in a machine (e.g., the article 700) performing any of the actions described with respect to the methods of FIG. 6, and the systems of FIGS. 3-5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a downhole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716, including image data that is associated with a well, its components (e.g., casing and/or cement), as well as the surrounding formation.

In various embodiments, the article 700 may comprise communication apparatus 722, which may in turn include amplifiers 726 (e.g., preamplifiers or power amplifiers) and one or more energy detection apparatus 724 (e.g., the apparatus 100 shown in FIGS. 1-2). Signals 742 received or transmitted by the communication apparatus 722 may be processed according to the methods described herein.

Many variations of the article 700 are possible. For example, in various embodiments, the article 700 may comprise a downhole tool, including any one or more elements of the system 300 shown in FIG. 3.

In summary, the apparatus, systems, and methods disclosed herein, using a photon detector with intrinsic collimation, coupled to a PSR, may provide increased spatial resolution for imaging in the downhole environment. For example, the increased resolution can provide more information about defective areas inside well cement (e.g., the size and shape of voids, etc.), as well as an indication of variations in density within the surrounding formation. As a result of using such embodiments, the value of services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a photon detector having a columnar structure to direct an impinging energy; and
a position-sensitive readout having position-sensitive elements, wherein individual ones of the elements are associated with at least one column in the columnar structure to provide intrinsic collimation of the impinging energy from an outer surface of the at least one column to selected portions of the readout, wherein each column in the columnar structure comprises a cross-section that decreases in width as a distance from the position-sensitive readout increases.

2. The apparatus of claim 1, wherein the photon detector comprises a scintillator.

3. The apparatus of claim 1, wherein the position-sensitive readout comprises at least one of a charge-coupled device (CCD), a complementary metal-oxide semiconductor (CMOS) device, a position-sensitive solid state photomultiplier, or a multi-anode photomultiplier tube.

4. The apparatus of claim 1, wherein the individual columns have a shape selected from one of a cone, a needle, a pyramid, or a trapezoidal prism.

5. The apparatus of claim 1, wherein the photon detector comprises a semiconductor.

6. The apparatus of claim 5, wherein the position-sensitive readout comprises an electrical circuit to detect an electrical signal generated by the semiconductor in response to receiving at least a portion of the energy at the position-sensitive elements, as directed thereto by the columnar structure of the detector.

7. The apparatus of claim 6, wherein the electrical circuit comprises an application specific integrated circuit (ASIC).

8. A system, comprising:
a source of energy;
an energy detection apparatus comprising a photon detector and a position-sensitive readout, the photon detector having a columnar structure to direct an impinging energy provided by the source, and the position-sensitive readout having position-sensitive elements, wherein individual ones of the elements are associated with at least one column in the columnar structure to provide intrinsic collimation of the impinging energy from an outer surface of the at least one column to selected portions of the readout, wherein the column in the columnar structure comprises a cross-section that decreases in width as a distance from the position-sensitive readout increases; and
a housing to contain at least one of the source of energy or and the energy detection apparatus, the housing comprising one of a wireline tool or a drilling tool.

9. The system of claim 8, wherein the source of energy comprises one of a continuous X-ray source or a pulsed X-ray source.

10. The system of claim 8, further comprising:
a processor coupled to a memory including a program, wherein the program is to direct the processor to operate the energy source and to receive signals provided by the position-sensitive readout.

11. The system of claim 8, wherein the photon detector comprises one of a scintillator or a semiconductor.

12. The system of claim 8, wherein the position-sensitive readout comprises one of a charge-coupled device (CCD), a complementary metal-oxide semiconductor (CMOS) device, a position sensitive solid state photomultiplier, or a multi-anode photomultiplier tube.

13. A method, comprising:
receiving energy impinging on an outer surface of a photon detector having a columnar structure; and
directing the energy within the columnar structure to a position-sensitive readout to image the energy, wherein the position-sensitive readout has position-sensitive elements, and wherein individual ones of the elements are associated with at least one column in the columnar structure to provide intrinsic collimation of the energy from the outer surface to selected portions of the readout, wherein each column in the columnar structure comprises a cross-section that decreases in width as a distance from the position-sensitive readout increases.

14. The method of claim 13, wherein the energy comprises X-ray energy, further comprising:
converting the X-ray energy to light or electron-hole pairs.

15. The method of claim 14, wherein the columnar structure serves as a waveguide for the light, or a channel to confine drift of the electron-hole pairs.

16. The method of claim 13, further comprising:
imaging the energy by detecting one of light or an electrical signal at a surface of the readout.

17. The method of claim 13, further comprising:
one of integrating charge or counting photons at a surface of the readout.

18. The method of claim 13, further comprising:
resolving a quantity or a spatial distribution of the energy at a surface of the position-sensitive readout to provide downhole formation images.

* * * * *